(12) United States Patent
Ossig et al.

(10) Patent No.: US 7,869,005 B2
(45) Date of Patent: Jan. 11, 2011

(54) METHOD AND DEVICE FOR DETERMINING A DISTANCE FROM AN OBJECT

(75) Inventors: Martin Ossig, Tamm (DE); Philipp Schumann, Stuttgart (DE)

(73) Assignee: Faro Technologies, Inc., Lake Mary, FL (US)

( * ) Notice: Subject to any disclaimer, the term of this patent is extended or adjusted under 35 U.S.C. 154(b) by 0 days.

(21) Appl. No.: 12/698,473

(22) Filed: Feb. 2, 2010

(65) Prior Publication Data

US 2010/0195087 A1 Aug. 5, 2010

Related U.S. Application Data

(63) Continuation of application No. PCT/EP2009/050888, filed on Jan. 27, 2009.

(30) Foreign Application Priority Data

Feb. 1, 2008 (DE) ................ 10 2008 008 063
Mar. 3, 2008 (DE) ................ 10 2008 014 275

(51) Int. Cl.
*G01C 3/08* (2006.01)

(52) U.S. Cl. ................ 356/5.01; 356/3.01; 356/3.1; 356/4.01; 356/4.1; 356/5.1

(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

2004/0027554 A1* 2/2004 Ishinabe et al. .............. 356/5.1

* cited by examiner

*Primary Examiner*—Thomas H. Tarcza
*Assistant Examiner*—Luke D Ratcliffe
(74) *Attorney, Agent, or Firm*—Cantor Colburn LLP

(57) ABSTRACT

A device for determining a distance from an object may include a light emitter for emitting an emission light beam, a light receiver for receiving a reception light beam, and an evaluation unit for determining the distance on the basis of a propagation time of the emission and reception light beams. The reception light beam may arise as a result of reflection of the emission light beam at the object. The light receiver may have a reception optical unit comprising a first lens element and a pinhole diaphragm. A light-impermeable element may shade a central region of the reception optical unit in such a way that the reception light beam is incident in the form of a light ring on the pinhole diaphragm. A second lens element, which is substantially hat-shaped in cross section, is arranged between the first lens element and the pinhole diaphragm.

15 Claims, 3 Drawing Sheets

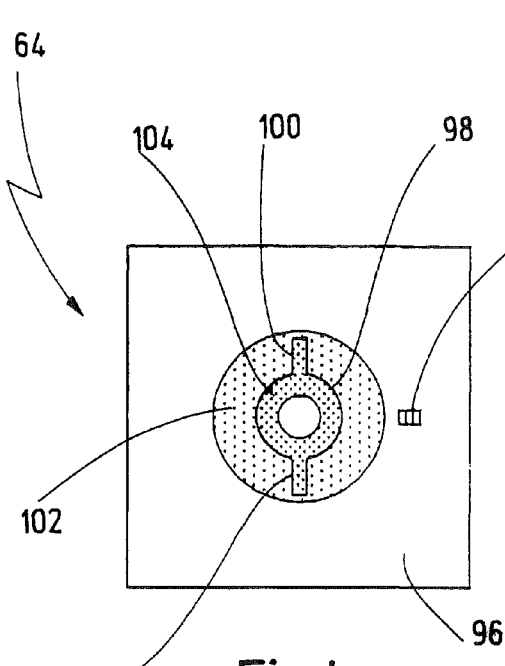
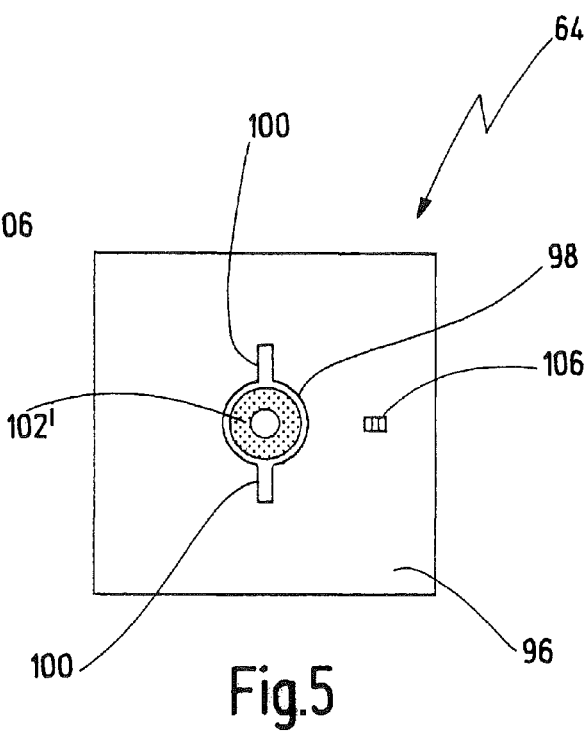
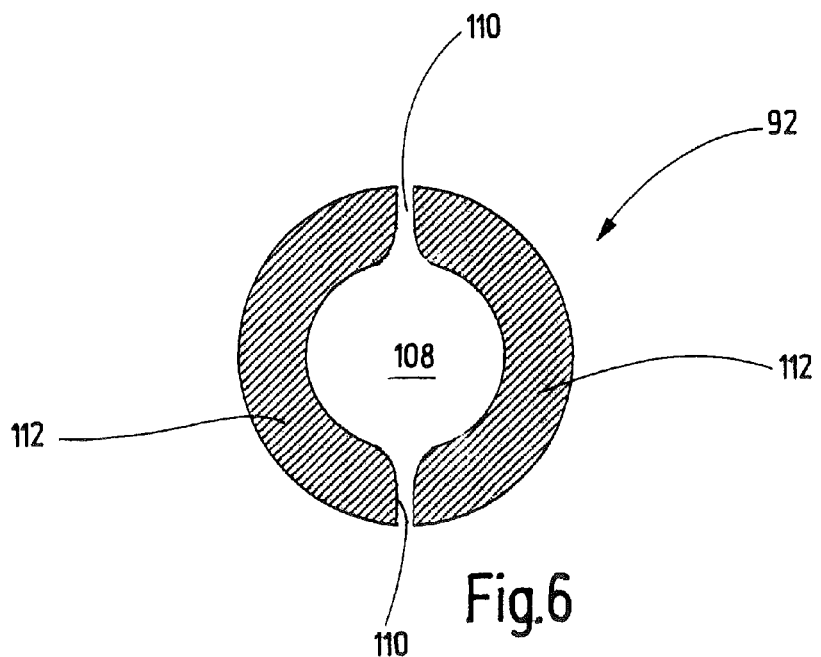

METHOD AND DEVICE FOR DETERMINING A DISTANCE FROM AN OBJECT

CROSS REFERENCE TO RELATED APPLICATIONS

This is a Continuation Application of International Application No. PCT/EP2009/050888, filed on Jan. 27, 2009 priority to which is claimed under 35 U.S.C. §120. Priority under 35 U.S.C. §119(a) and 35 U.S.C. §365(b) is also claimed from German Application Nos. 10 2008 008 063.2, filed Feb. 1, 2008; and 10 2008 014 275.1, filed Mar. 3, 2008, the disclosures of which are also incorporated herein by reference.

FIELD OF INVENTION

The present invention relates to a device for determining a distance from an object.

BACKGROUND

Such a device is known in principle from DE 20 2006 005 643 U1, although this document does not disclose any details of a reception optical unit. The applicant of the present application has, however, already sold devices as described in DE 20 2006 005 643 U1 including a reception optical unit comprising a pinhole diaphragm and a lens element, under the product designation LS 840/880.

The known device, known as a laser scanner, is designed to measure a spatial region and/or an object three-dimensionally. Typical applications include the measurement of the interior of a large workshop, the measurement of large objects such as buildings or ships' hulls, or the forensic measurement of a crime scene. The known laser scanner has a measuring head that can be rotated about a vertical axis. The measuring head contains a rotor with a minor inclined by 45°, which is arranged opposite a light emitter and a light receiver. The light emitter generates an emission light beam, which is deflected with the aid of the rotating minor in such a way that a vertical scanning fan arises. A reception light beam reflected from an object is diverted via the mirror onto the light receiver. The distance between the measuring head and the object point at which the emission light beam was reflected is determined from the propagation time of the emission and reception light beams. Rotation of the measuring head about the vertical axis makes it possible to rotate the (vertical) scanning fan in azimuth, such that it is possible to measure practically the entire spatial region around the laser scanner.

DE 20 2006 005 643 U1 describes an advantageous combination of such a laser scanner with an image recording unit that is designed to record a color image of the spatial region to supplement the distance measuring values.

One known problem in the case of such a laser scanner or more generally in the case of a distance measuring device which evaluates the propagation time of an emission and reception light beam involves the large intensity differences which the reception light beam can have, depending on the respective measuring distance. The larger the distance between the light emitter/light receiver and the object, the lower the signal power with which the reception light beam reaches the light receiver. In order to enable a large measuring range, the light receiver must be able to process the intense-power reception signals from short distances, on the one hand, and the weak-power reception signals from large distances, on the other hand. If the reception power is too high, the light detector is overdriven, which in extreme cases can lead to destruction of the light receiver. Even if the light receiver is not destroyed or damaged, reliable distance determination is not possible at an excessively high reception signal power. By contrast, if the reception power is too weak, the reception signal can no longer be distinguished from unavoidable interference such as ambient and detector noise.

In the case of the known laser scanner, the light emitter is situated coaxially in front of the reception optical unit and shades the central region thereof. On account of this, the reception light beam reaches the reception optical unit only in the form of a light ring from which the central region is "cut out". This light ring is imaged onto the pinhole diaphragm by a lens element. If the diameter of the imaged light ring is smaller than the diameter of the pinhole diaphragm, the light ring fits completely through the pinhole diaphragm. In this case, the entire reception light beam with the exception of the shaded central region can be incident on a light detector arranged downstream of the pinhole diaphragm. However, if the diameter of the light ring is larger than the diameter of the pinhole diaphragm, the pinhole diaphragm limits the quantity of light that reaches the light detector. On account of the imaging properties of the reception optical unit, the diameter of the light ring depends on the distance covered by the reception light beam. The diameter of the light ring is small for large distances. The diameter of the light ring increases toward short distances. Owing to this behavior, a reception light beam from a large distance is imaged completely (with the exception of the central shading by the light-impermeable element) on the light detector, while a reception light beam from a short distance reaches the light detector only in part. This compensates somewhat for the different reception signal powers depending on the distance.

It has been shown, however, that this type of compensation is not optimal, since the light ring can become so large toward shorter distances that, on account of the central shading, it is no longer possible for any reception light at all to pass through the pinhole diaphragm. Consequently, the measuring range of the known laser scanner is disadvantageously limited toward short distances.

SUMMARY OF THE INVENTION

At least an embodiment of the present invention enables a distance to be determined over an extended measuring range. The determination of the distance is intended to be possible with high accuracy for short and large distances. According to at least an embodiment of the invention, this can be achieved by means of a device of the type mentioned in the introduction wherein a second lens element, which is substantially hat-shaped in cross section, is arranged between the first lens element and the pinhole diaphragm.

The second lens element is therefore a complexly shaped lens element. It has in cross section a relatively thick central region and a relatively thin peripheral region, between which a (preferably curved) transition region is arranged. On account of the complex hat shape, the transition region is deeper than the central region and the peripheral region when considering the cross section of the second lens element. This lens shape with radially outwardly varying steepnesses, wherein the transition region has a significantly higher steepness in cross section, has the effect that light beams incident on the lens element in the transition region are refracted differently than light beams incident on the central region of the lens element. With the aid of such a position-dependent behavior, it is possible to deflect light beams from different distances to different extents. In particular, the novel second lens element can ensure that reception light beams from shorter distances, which would be almost completely suppressed in the case of the known laser scanner, can now pass through the pinhole diaphragm with a certain light proportion. The novel device therefore has an extended measuring range toward short distances.

The light-impermeable element is preferably a part of the light emitter which is arranged coaxially with respect to the light receiver in front of the latter. This coaxial arrangement makes it possible to dispense with beam splitters in the emission and reception light path and, consequently, the novel device can be realized very cost-effectively and compactly. The measuring accuracy of the novel device is high over the entire measuring range.

The goals specified above is therefore fully achieved.

In one preferred configuration, the first lens element defines a focal point at which the pinhole diaphragm is arranged.

This configuration contributes to optimizing the measuring range toward large distances by avoiding a disadvantageous shading of reception light beams from larger distances. All reception light beams from large distances are focused onto the pinhole diaphragm in this configuration.

In a further configuration the hat-shaped second lens element has a cross-sectionally thicker central region, a cross-sectionally thinner peripheral region and a transition region connecting the thicker central region and the thinner peripheral region, wherein the central region is substantially planar in cross section. Preferably, the central region is exactly planar and the transition region is adjacent to the central region with an S-shaped course (in cross section). This configuration has the advantage that reception light beams that pass through the central region remain substantially or even completely uninfluenced. The influence of the second lens element can therefore be limited to reception light beams from shorter distances. For reception light beams from larger distances, the novel lens element is at least substantially functionless. This configuration advantageously contributes to realizing an optimum reception power characteristic for an extended measuring range.

In a further configuration, the second lens element is an annular lens having a through opening which forms the central region.

In this configuration, the central region is a "hole" arranged in the center of the lens element. The light beams that pass through the second lens element in the central region are not influenced by the lens element. Advantageously, neither attenuation nor refraction takes place here.

In an alternative configuration, by contrast, the second lens element is a solid body.

In this configuration, the central region is likewise "filled" with a light-transparent material. This configuration has the advantage that the complex lens element can be produced more simply, more cost-effectively and more stably.

In a further configuration, the novel device has a mask composed of a light-impermeable material, which mask partly covers the transition region and leaves free the central region. Preferably, the mask also covers the peripheral region.

This configuration enables the reception power characteristic of the novel device to be optimized further by virtue of the (high) light intensity of a reception light beam being limited with the aid of the mask. On the other hand, the mask leaves free the central region, such that reception light beams from larger distances still remain uninfluenced.

In a further configuration, the mask predominantly covers the transition region.

This configuration is advantageous since the quantity of light in the reception light beams increases very greatly with decreasing distance. With a large-area mask, this great increase at short distances can be limited very simply and efficiently.

In a further configuration, the mask has at least one slotted opening arranged in the transition region.

A slotted opening in the mask enables an efficient adaptation of the reception light power in a very simple and cost-effective manner. In particular, with the aid of a slotted opening it is readily possible to "cut out" parts of the ring-shaped reception light beam in a targeted manner in order to feed them to the downstream light detector.

It is particularly advantageous if the slotted opening runs from the central region to the peripheral region. Preferably, the slotted opening runs radially from the central region to the peripheral region.

As an alternative, it would be conceivable, for example, to arrange one or more circular slots in the mask in order in each case to "cut out" annuli from the ring-shaped reception light beam. The configuration preferred here has the advantage, by contrast, that the reception light from shorter distances can pass through the mask substantially independently of the respective size and position of the light ring. This configuration enables a very uniform adaptation of the reception light power at short distances.

In a further configuration the hat-shaped second lens element has a substantially planar rear side. Preferably, the mask is arranged on the planar rear side.

This configuration contributes to a simple and cost-effective realization. Furthermore, this configuration makes it possible to reduce the influence of the second lens element on reception light beams from larger distances, with the result that the maximum measuring range is not disadvantageously influenced by the novel second lens element.

In a further configuration, the pinhole diaphragm has a central opening and a further slotted opening arranged radially with respect to the central opening. Preferably, the slotted openings in the pinhole diaphragm and in the mask are arranged substantially congruently with respect to one another.

This configuration introduces a further degree of freedom, with the aid of which it is possible to optimize the reception power curve for a large distance measuring range. The further degree of freedom furthermore enables a simpler and more cost-effective formation of the second lens element.

In a further configuration, the light receiver has a first and at least one second light detector, wherein the first light detector generates a first electrical signal in a manner dependent on the reception light beam and wherein the second light detector generates a second electrical signal, which is representative of color information of the object.

The first electrical signal is representative of the brightness of the measuring point, in particular, and is advantageously used for determining the distance in a manner known per se. The second light detector is a color detector, which usually comprises three or more light-sensitive pixels that are sensitive to different wavelengths. A color separation is obtained on account of the wavelength-dependent sensitivity. In preferred exemplary embodiments, the color detector supplies color information that is representative of the red wavelength range, the green wavelength range and the blue wavelength range. This configuration makes it possible to obtain an optical color image of the measuring point to supplement the distance information from the first electrical signal. The additional information contributes to documenting the measuring environment and to interpreting the distance measuring values more simply.

In a further configuration, the device has a rotary mirror having a rotation direction in order to guide the emission light beam over the object, wherein the second light detector is arranged offset in the rotation direction.

In this configuration, the first and the second light detector are arranged spatially offset with respect to one another in such a way that they look at different object points within the surrounding spatial region by means of the rotary mirror.

In contrast to this, DE 20 2006 005 643 U1 cited in the introduction proposes, for example, a device wherein an image recording unit for recording an optical image is oriented toward the same object point as the emission light beam. The configuration preferred here, which also inherently constitutes an inventive development of the known laser scanner, deliberately dispenses with orienting the emission light beam and the viewing direction of the second light detector toward the same object point. In this case, the present configuration makes use of the fact that the viewing direction of the second light detector follows the viewing direction of the first light detector or of the emission light beam with a temporal delay on account of the rotation of the rotary minor. On account of the fixed arrangement of the light emitter and of the two light detectors relative to one another, the second light detector sees a measured object point with a temporal delay (or lead). This configuration has the advantage that the optical image of the spatial region can be recorded in the same scanning cycle as that in which the distances from the object points are determined. Furthermore, this configuration enables a very compact realization that affords ease of operation.

In a further configuration the pinhole diaphragm has a pinhole diaphragm body, at which the second light detector is arranged.

This novel configuration enables a very compact and robust design. Moreover, the reception power characteristic for the second light detector is in this case independent of the reception power characteristic for the first light detector, that is to say that the reception light for the second light detector is influenced to a lesser extent, or not at all, by the measures described above. This is advantageous since the reception light for the second light detector does not have the great distance-dependent intensity differences like the reception light beam.

In a further configuration, the device has a graphics display that is designed to display a distance image and/or an optical image of the object.

This configuration is particularly advantageous for a laser scanner of the type described in the introduction, which generates a very large amount of measuring data and/or optical image data on account of its scanning capability. A graphics display enables this quantity of data to be displayed directly (that is to say without a supplementary notebook, etc.) on the device itself. The user can therefore rapidly form an impression of the quality, completeness and relevance of the measuring values. Furthermore, such a graphics display can be used very advantageously as a user interface for data inputting for a parameterization, etc.

It goes without saying that the features mentioned above and those yet to be explained below can be used not only in the combination respectively specified, but also in other combinations or by themselves, without departing from the scope of the present invention.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 4 shows a pinhole diaphragm body with the pinhole diaphragm of the reception optical unit from FIG. 3 in a first operating situation, FIG. 5 shows the pinhole diaphragm from FIG. 4 in a second operating situation, and FIG. 6 shows a preferred exemplary embodiment of a mask that is used in the reception optical unit from FIG. 3.

DETAILED DESCRIPTION OF THE PREFERRED EMBODIMENTS

Figure 1:
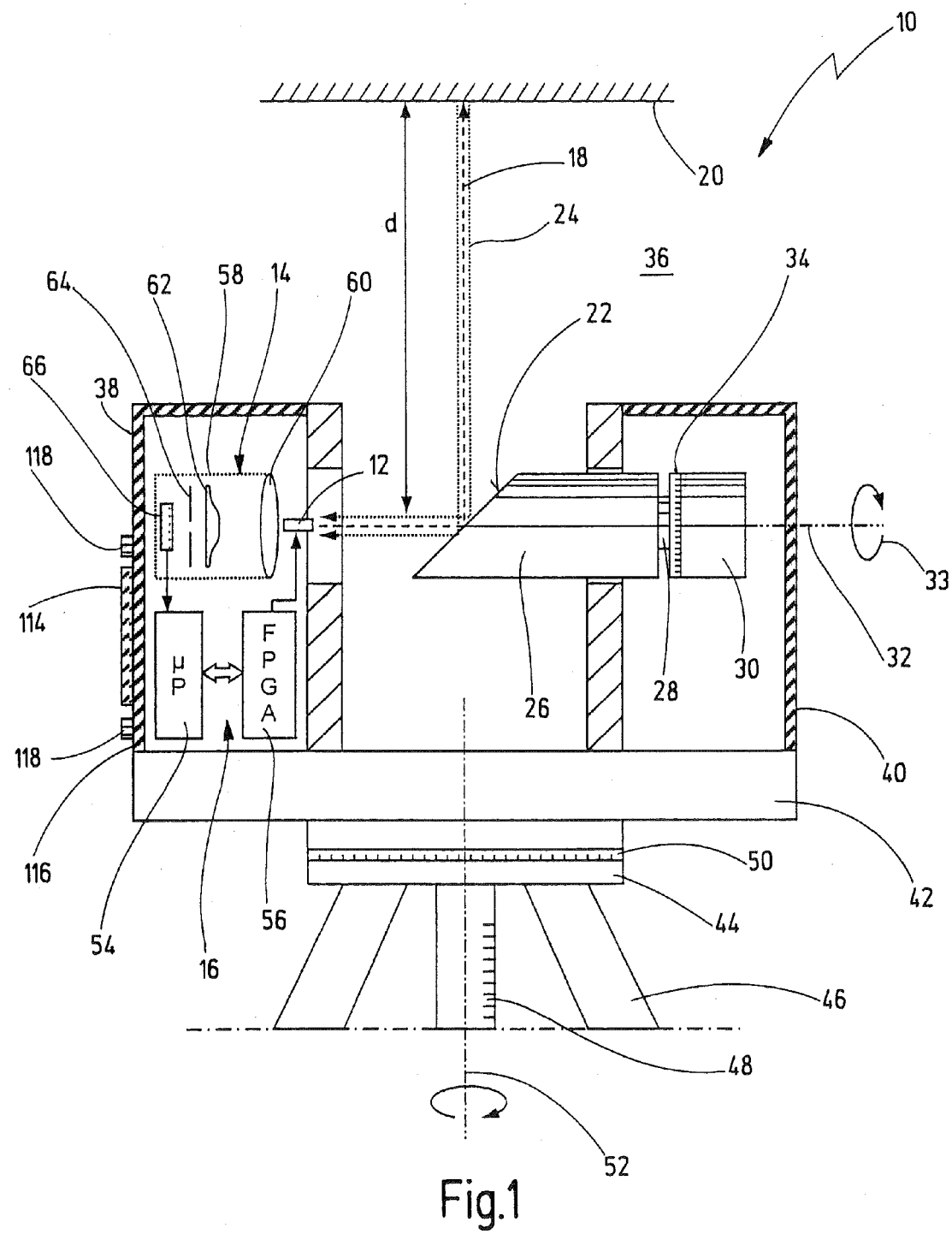
FIG. 1 shows a laser scanner according to at least an embodiment of the invention.

In FIG. 1, a laser scanner is designated in its entirety by the reference numeral 10. The laser scanner 10 is one possible embodiment of a device according to the present invention. However, the novel device can also be a simple distance measuring device which measures one-dimensionally and which determines the distance from an object with the aid of a emission light beam and a reception light beam. The invention is also not restricted to the use of light beams in the narrower sense (wavelengths between 300 and 1000 nm), but rather can in principle also be realized with electromagnetic waves from a different wavelength range as long as a quasi-optical propagation is present. The expression light beam as used here therefore encompasses such electromagnetic waves as well.

The laser scanner 10 comprises a light emitter 12 and a light receiver 14, which are connected to an evaluation and control unit 16. In the preferred exemplary embodiment, the light emitter 12 comprises a laser diode that is designed to generate a laser beam 18 having a wavelength of approximately 790 nm as an emission light beam. The emission light beam 18 is emitted in order to illuminate an object point at an object 20. In one preferred exemplary embodiment, the emission light beam 18 is amplitude-modulated with a rectangular-waveform modulation signal in order to determine the distance d from the illuminated object point by evaluating phase information. A preferred modulation signal is described in a parallel patent application in the name of the present applicant. As an alternative to this, the emission light beam 18 can be modulated with a sinusoidal modulation signal and/or the emission light beam 18 can be emitted in pulsed fashion in order to determine the distance d on the basis of a pulse propagation time method.

The emission light beam 18 is deflected here by a mirror 22 to the object 20. The reference number 24 designates a reception light beam that is reflected from the object 20 and is deflected via the mirror 22 to the receiver 14. The mirror 22 is arranged here at the front end face of a cylinder 26 connected to a rotary drive 30 via a shaft 28. With the aid of the rotary drive 30, the mirror 22 can be rotated about an axis 32 of rotation. The rotation direction is indicated here by reference numeral 33. The respective rotary position of the mirror 22 can be determined with aid of an encoder 34. The output signals of the encoder 34 are likewise fed to the evaluation and control unit 16, though this is not illustrated here for reasons of clarity.

In the preferred exemplary embodiment, the axis 32 of rotation is arranged horizontally and the mirror 22 is inclined at an angle of approximately 45° relative to the axis 32 of rotation. A rotation of the minor 22 about the horizontal axis 32 therefore has the consequence that the emission light beam 18 is deflected along a vertical plane (that is to say in elevation). The emission light beam 18 forms, when the mirror 22 is rotating, a fan with which the spatial region 36 is scanned in the vertical plane.

The laser scanner 10 here has a housing structure essentially having two housing parts 38, 40. The housing parts 38, 40 are arranged on a common baseplate 42. The emitter 12, the receiver 14 and the evaluation and control unit 16 are accommodated in the housing part 38 illustrated on the left in FIG. 1. The housing part illustrated on the right in FIG. 1 accommodates the rotary drive with the encoder 34 and the cylinder 26, wherein the cylinder 26 with the minor 22 projects from the housing part 40, such that the minor 22 is arranged approximately centrally between the two housing parts 38, 40.

The baseplate 42 is arranged on a rotary drive 44 seated on a stand 46. The stand 46 is height-adjustable and has a scaling 48 in order to be able to perform a reproducible height setting. The reference numeral 50 designates a further encoder, with the aid of which the rotational position of the rotary drive 44 can be determined. The output signals of the encoder 50 are likewise fed to the evaluation and control unit 16 (not illustrated here).

The rotary drive 44 enables the laser scanner 10 to be rotated about a vertical axis 52 which together with the axis 32 of rotation defines an axial intersection point. The axial intersection point here lies approximately centrally on the minor 22 and, in preferred exemplary embodiments, defines the origin of the system of coordinates to which all the distance measuring values d are referred. With the aid of the rotary drive 44, the vertical "scanning fan" can be rotated by 360° in azimuth. The emission light beam 18 can thus illuminate practically any object point in the vicinity of the scanner 10. Shading takes place only toward the bottom by the baseplate 42, such that the viewing angle of the laser scanner 10 is limited somewhat toward the bottom.

The evaluation and control unit 16 here comprises a microprocessor 54 and an FPGA (field programmable gate array) 56. The FPGA 56 here generates the binary rectangular-waveform modulation signal with which the laser diode of the light emitter 12 is driven. The microprocessor 54 reads in digitized reception data from the light receiver 14 and determines the distance d between the laser scanner 10 and the object 20 on the basis of these data. The microprocessor 54 and the FPGA 56 communicate with one another, wherein the microprocessor 54 receives, inter alia, the phase information of the emission light beam for determining the propagation time.

The reception optical unit 58 of the light receiver 14 comprises at least one first lens element 60 (there can also be a plurality of first lens elements which together fulfill the function of the first lens element described below), a second lens element 62 and a pinhole diaphragm 64. The light detector 66 is arranged behind the pinhole diaphragm 64 and detects the reception light beam 24. As can readily be understood, the light emitter 12 shades the reception light beam 24 in a central region of the reception optical unit since the light emitter 12 here is arranged coaxially in front of the light receiver 14. In order to illustrate this shading pictorially, the reception light beam 24 is illustrated "doubly" and with an exaggerated width in comparison with the emission light beam 18. The reception light beam 24 actually reaches the light detector 66 here in the form of a light ring whose inner center is shaded by the light emitter 12.

Figure 2:
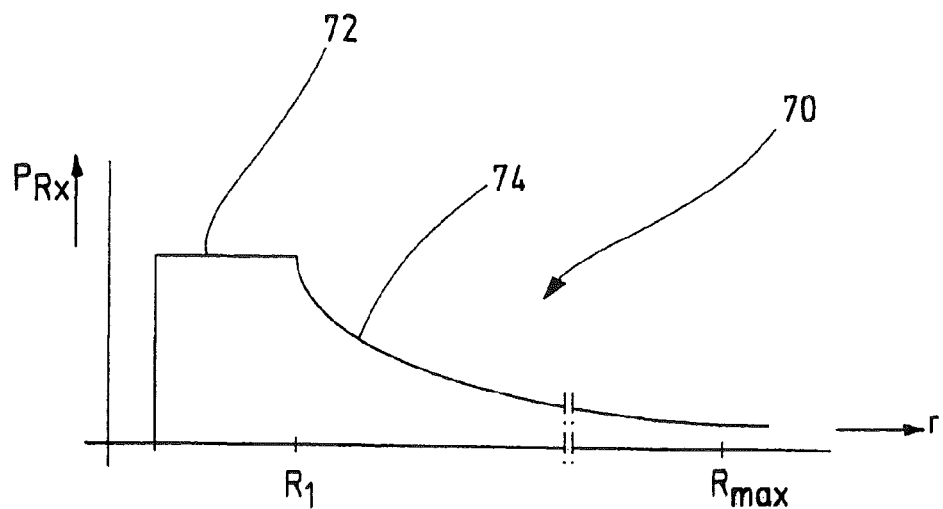
FIG. 2 shows the reception power characteristic of the laser scanner from FIG. 1 in an idealized illustration.

FIG. 2 shows an idealized reception power characteristic of the light receiver 14 as a function of the measuring distance r. As can readily be discerned, up to a distance of approximately 0.5 meter, no reception light beam 24 at all is detected. In other words, the light receiver 14 is "blind" or not ready for reception for targets at this distance. This blindness is realized deliberately here in order, in particular, to suppress a direct crosstalk of the emission light beam 18 owing to scattering effects. The restriction of the measuring range can be accepted for such a short distance.

Starting from the lower measuring range limit of approximately 0.5 meter, the reception power characteristic "jumps" to a maximum value. This maximum value is substantially constant over a range 72, that is to say that reception light beams 24 from a distance lying within the first distance range 72 reach the light detector 66 with a substantially identical reception power; although the reception power decreases in principle with increasing distance. The plateau in the distance range 72 is realized here primarily with the aid of the reception optical unit described below by virtue of the fact that the much higher power of the reception light beams from short distances is limited in an optical manner with the aid of the reception optical unit.

Starting from a distance Ri, the plateau 72 is followed by a hyperbolic curve profile according to which the reception power decreases continuously as the distance increases further. The curve profile in the distance range 74 corresponds to the system-dictated decrease in the reception power. Starting from a distance $R_{max}$ the reception power is so low that reliable distance determination is no longer possible. In one preferred exemplary embodiment of the preferred laser scanner, the distance $R_{max}$ is approximately 70 meters.

Figure 3:
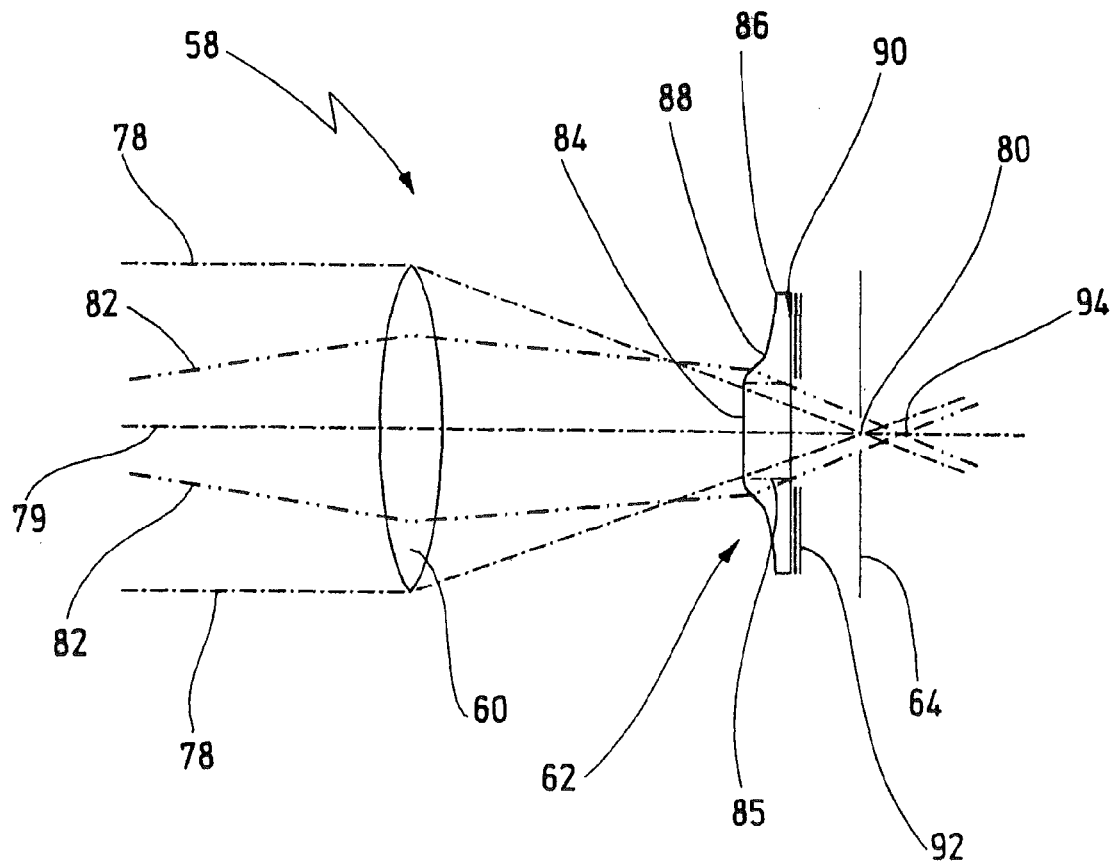
FIG. 3 shows the reception optical unit of the laser scanner from FIG. 1 in a simplified illustration.

FIG. 3 illustrates the functioning of the reception optical unit 58. Identical reference symbols designate the same elements as before.

The pinhole diaphragm 64 here is arranged at the focal point 80 of the imaging system, the properties of which are essentially determined by the first lens element 60 (or the group of first lens elements). This is illustrated on the basis of the beams 78 that are incident on the first lens element 60 as parallel beams and are deflected by the lens element 60 in such a way that they meet at the focal point 80. The assumption that the beams 78 reach the lens element 60 as parallel beams is correct for large distances to a good approximation.

The assumption of parallel beams is not correct, however, for smaller distances. By way of example, the illustration shows a pair of beams 82 that runs divergently outward and impinges on the lens element 60. The beams 82 are likewise deflected by the lens element 60, but not focused at the focal point 80. Consequently, the beams 82 could not pass through the pinhole diaphragm 64 without the second lens element 62.

The second lens element 62 is arranged between the first lens element 60 and the pinhole diaphragm 64. It has a hat-shaped cross section with a thicker central region 84, a thin peripheral region 86 and a transition region 88 connecting the central region 84 and the peripheral region 86. In other words, the peripheral region 86 is cross-sectionally thinner than the central region 84. The second lens element 60 is arranged substantially perpendicular to the optical axis 79, wherein the optical axis of the reception optical unit passes approximately centrally through the second lens element 60. In the preferred exemplary embodiment, the central region 84 is planar. The outer peripheral region 86 is also planar in preferred exemplary embodiments. By contrast, the transition region 88 has a curvature that is approximately S-shaped here in cross section, wherein the radius of curvature or the slope of the curved profile firstly increases continuously proceeding from the central region 84 and then decreases again toward the peripheral region. The rear side 90 of the second lens element 62 is planar. In the preferred exemplary embodiment, a mask 92 (FIG. 6) composed of a light-impermeable material is arranged at the rear side 90.

As is illustrated in FIG. 3, the second lens element 62 is arranged in such a way that the focal point beams 80 pass through the planar central region 84 and, consequently, remain substantially uninfluenced. In one exemplary embodiment, the central region 84 is a through opening, which is indicated by reference numeral 85, and the second lens element is an annular lens. In other exemplary embodiments, the second lens element 84 is a—preferably integral—solid body composed of transparent material.

On account of the planar front side and rear side of the second lens element 62 in the central region, the second lens element 62 does not influence the focal point beams 80 at all, or influences them at most like a flat disk. By contrast, the beams 82 impinge on the lens element 62 in the curved transition region 88. In the transition region the lens element 62 is embodied in such a way that the beams 82 impinging here are deflected in such a way that they pass through the pinhole diaphragm 64. The further out the beams are incident on the transition region, the greater the extent to which they are deflected in the direction toward the pinhole diaphragm 64. However, the focal point 94 for the deflected beams 82 lies behind the pinhole diaphragm 64, with the result that an image transmitted by the beams 82 appears unsharp on the pinhole diaphragm 64. The nearer an object point is to the reception optical unit 58, the greater the unsharpness.

FIGS. 4 and 5 show the effect of the reception optical unit 58 on the basis of two examples. The illustrations show the plan view of a pinhole diaphragm carrier 96, in which one circular diaphragm opening 98 and two slotted openings 100 are arranged. The slotted openings 100 run from the circular, central opening 98 radially outward. The central circular opening 98 and the slotted openings 100 together form a combined diaphragm opening with a continuous "dash-dot-shaped" opening region. The reference numeral 102 designates a light ring that is imaged onto the pinhole diaphragm carrier 96 through the lens elements 60, 62. FIG. 4 shows a case in which the reception light beam 24 impinges from a relatively small distance on the reception optical unit 58. This has the consequence that the diameter of the light ring 102 is large and only a part 104 (illustrated somewhat darker) of the light ring 102 can pass through the combined diaphragm opening 98. That part of the light ring 102 which reaches beyond the diaphragm opening 98 is blocked by the diaphragm 64. The reception power of the reception light beam 24 is thereby reduced.

FIG. 5 shows a second case, in which the reception light beam 24 impinges from a larger distance on the reception optical unit 58. On account of the larger distance, the light ring 102' here is imaged completely into the diaphragm opening 98, that is to say that the entire quality of light that reaches the reception optical unit 58 can pass through the diaphragm 64 and reach the light detector 66.

The reference numeral 106 designates a second light detector, which here comprises three light-sensitive pixels that are sensitive to different wavelengths. As an alternative, the second light detector can be an area image sensor that is sensitive to different wavelengths. The latter option is advantageous in order to ensure that the second light detector is always illuminated by the light ring 102/102'. The light detector 106 is a color detector which, in preferred exemplary embodiments of the laser scanner 10, is arranged on the pinhole diaphragm carrier 96. The arrangement is chosen such that the second light detector 106 "looks", in each case with a temporal delay, at an object point on the object 20 which was previously illuminated by the emission light beam 18. The temporal delay is a consequence of the rotation of the minor 22 about the horizontal axis 32.

FIG. 6 shows the mask 92 on the rear side of the second lens element 62 in a plan view. In the preferred exemplary embodiment, the mask has an open central region 108 arranged congruently with respect to the planar central region 84 of the lens element 62. The open central region 108 runs into two slotted openings 110, which, in preferred exemplary embodiments, are arranged approximately congruently with respect to the slotted openings 100 in the pinhole diaphragm 64. The dark-hatched region 112 of the mask 92 is composed of a light-impermeable material. In preferred exemplary embodiments, the mask 92 is fixed on the rear side 90 of the lens element 62 in such a way that the regions 112 are situated congruently with respect to the transition region 88. Accordingly, light beams 82 which impinge on the lens element 62 in the transition region 88 can leave the lens element 62 only in the region of the slotted openings 110, with the result that the quantity of light from reception light beams 24 from a short distance is reduced further.

In the preferred laser scanner 10, therefore, four elements interact in order to produce the reception power characteristic illustrated in FIG. 2. These four elements are the pinhole diaphragm 64 (more precisely the circular diaphragm opening of the pinhole diaphragm 64), the slotted extensions 100 of the diaphragm 64, the hat-shaped second lens element 62 and the mask 92. The lens element 62 ensures that reception light beams from shorter distances can pass through the combined diaphragm opening 98. The high light intensity of these reception light beams from a short distance is limited again with the aid of the mask 92 in order overall to arrive at the characteristic from FIG. 2.

In a particularly preferred exemplary embodiment, which also inherently constitutes an inventive development of the known laser scanner, the novel laser scanner 10 has a graphics display 114, which here is arranged on an outer housing wall 116 of the housing part 38. The graphics display 114 is driven by the microprocessor 54, and it serves as a user interface. In one preferred exemplary embodiment, the graphics display 114 is a touch-sensitive screen (touch screen). In addition or as an alternative thereto, operating keys 118, embodied here as so-called soft keys, are arranged on the housing wall 116 in the region of the graphics display 114. In the case of these soft keys, the function of the operating keys 118 changes depending on what is respectively displayed on the graphics display 114. In the preferred exemplary embodiment, the graphics display 114 furthermore serves to display a distance image and/or an optical image that was recorded with the aid of the first and/or second light detector 66, 106. The distance image shows the recorded spatial region 36 in the form of a black and white image or in the form of a false color representation, wherein each represented pixel represents a distance measuring value that can be displayed when a cursor moves to the corresponding pixel. The optical image is preferably a color image which was recorded with the aid of the second light detector 106 and which shows the spatial region 36.

In preferred exemplary embodiments, the laser scanner 10 is designed furthermore to display on the graphics display 114 an SD representation generated from the combined distance and image information. With the aid of the soft keys 118, it is additionally possible to set operating parameters of the laser scanner 10 such as, for instance, the transmission power of the emission light beam 18, the scanning region in azimuth and in elevation or the scan resolution.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A device for determining a distance from an object, comprising:
   a light emitter for emitting a emission light beam;
   a light receiver for receiving a reception light beam that arises as a result of reflection of the emission light beam at the object; and
   an evaluation unit for determining the distance on the basis of a propagation time of the emission and reception light beams;
   wherein the light receiver has a reception optical unit comprising:
      a first lens element; and
      a pinhole diaphragm;
   wherein a light-impermeable element shades a central region of the reception optical unit in such a way that the reception light beam is incident in the form of a light ring on the pinhole diaphragm; and
   wherein a second lens element, which is substantially hat-shaped in cross section, is arranged between the first lens element and the pinhole diaphragm.

2. The device according to claim 1, wherein the first lens element defines a focal point at which the pinhole diaphragm is arranged.

3. The device according to claim 1, wherein the hat-shaped second lens element has a central region, a peripheral region that is cross-sectionally thinner than the central region; and a transition region connecting the thicker central region and the thinner peripheral region, wherein the central region is substantially planar in cross section.

4. The device according to claim 3, wherein the second lens element is an annular lens having a through opening which forms the central region.

5. The device according to claim 3, wherein the second lens element is a solid body.

6. The device according to claim 3, further comprising a mask composed of a light-impermeable material, wherein the mask partly covers the transition region and leaves free the central region.

7. The device according to claim 6, wherein the mask predominantly covers the transition region.

8. The device according to claim 6, wherein the mask has at least one slotted opening arranged in the transition region.

9. The device according to claim 8, wherein the slotted opening runs from the central region to the peripheral region.

10. The device according to claim 1, wherein the hat-shaped second lens element has a substantially planar rear side.

11. The device according to claim 1, wherein the pinhole diaphragm has a central opening and a further slotted opening arranged radially with respect to the central opening.

12. The device according to claim 1, wherein the light receiver has a first and a second light detector, wherein the first light detector generates a first electrical signal in a manner dependent on the reception light beam and wherein the second light detector generates a second electrical signal, which is representative of color information of the object.

13. The device according to claim 12, further comprising a rotary minor having a rotation direction in order to guide the emission light beam over the object, wherein the second light detector is arranged offset in the rotation direction.

14. The device according to claim 12, wherein the pinhole diaphragm has a pinhole diaphragm body, at which the second light detector (106) is arranged.

15. The device according to claim 1, further comprising a graphics display that is designed to display a distance image and/or an optical image of the object.

* * * * *